United States Patent
Yang et al.

(10) Patent No.: US 9,964,355 B2
(45) Date of Patent: May 8, 2018

(54) METHODS FOR PREPARING HIGHLY POROUS MICROFIBROUS MEDIA WITH FUNCTIONAL PARTICLES IMMOBILIZED INSIDE

(71) Applicant: IntraMicron, Inc., Auburn, AL (US)

(72) Inventors: Hongyun Yang, Auburn, AL (US); Paul S. Dimick, Waverly, AL (US); Troy J. Barron, Auburn, AL (US); Bruce J. Tatarchuk, Auburn, AL (US)

(73) Assignee: IntraMicron, Inc., Auburn, AL (US)

( * ) Notice: Subject to any disclaimer, the term of this patent is extended or adjusted under 35 U.S.C. 154(b) by 681 days.

(21) Appl. No.: 14/413,882

(22) PCT Filed: Mar. 13, 2013

(86) PCT No.: PCT/US2013/030890
§ 371 (c)(1),
(2) Date: Jan. 9, 2015

(87) PCT Pub. No.: WO2014/011227
PCT Pub. Date: Jan. 16, 2014

(65) Prior Publication Data
US 2015/0176894 A1     Jun. 25, 2015

Related U.S. Application Data

(60) Provisional application No. 61/669,911, filed on Jul. 10, 2012, provisional application No. 61/669,914, filed on Jul. 10, 2012.

(51) Int. Cl.
*F26B 1/00*     (2006.01)
*B01J 20/28*    (2006.01)
(Continued)

(52) U.S. Cl.
CPC ........... *F26B 1/00* (2013.01); *B01J 20/28004* (2013.01); *B01J 20/28023* (2013.01);
(Continued)

(58) Field of Classification Search
CPC ........ F26B 1/00; B01J 23/72; B01J 20/28078; B01J 20/28004; B01J 20/28023;
(Continued)

(56) References Cited

U.S. PATENT DOCUMENTS

| | | |
|---|---|---|
| 3,019,127 A | 1/1962 | Czerwonka |
| 5,102,745 A | 4/1992 | Tatarchuk |

(Continued)

FOREIGN PATENT DOCUMENTS

WO    2011057150    5/2011

OTHER PUBLICATIONS

Anonymous, "Microfibrous entrapment", http://www.intramicron.com/library/WhitePapers/IntramMicron_Entrapment.pdf, Retrieved from the internet Jun. 12, 2013.
(Continued)

*Primary Examiner* — Jun Yoo
(74) *Attorney, Agent, or Firm* — Pabst Patent Group LLP

(57) ABSTRACT

Improved methods for preparing highly porous mesh media and loading functional particles into the media are described herein. The highly porous media can be used as supports for catalyst materials for a variety of applications, such as desulfurization. Pre-manufactured catalyst can be loaded into the sintered open media. Thus, the contamination issues associated wetlay paper making and pre-oxidation, the deactivation issues associated with the sintering and pre-oxidation steps, and the corrosion issues associated with the catalyst formation step can be avoided. The methods described herein result in the formation of highly porous media with functional particles immobilized inside.

20 Claims, 3 Drawing Sheets

(51) Int. Cl.
*B01J 20/30* (2006.01)
*B01J 35/06* (2006.01)
*B01J 23/72* (2006.01)

(52) U.S. Cl.
CPC ... *B01J 20/28028* (2013.01); *B01J 20/28078* (2013.01); *B01J 20/30* (2013.01); *B01J 20/3042* (2013.01); *B01J 20/3064* (2013.01); *B01J 20/3078* (2013.01); *B01J 20/3085* (2013.01); *B01J 23/72* (2013.01); *B01J 35/06* (2013.01); *B01J 2220/42* (2013.01)

(58) Field of Classification Search
CPC .... B01J 35/06; B01J 20/3085; B01J 20/3078; B01J 20/3064; B01J 20/3042; B01J 20/30; B01J 20/28028; B01J 2220/42; B01D 39/00; B01D 39/02; B01D 39/04
See application file for complete search history.

(56) References Cited

U.S. PATENT DOCUMENTS

| | | |
|---|---|---|
| 6,207,255 B1 * | 3/2001 | Fukuura ............... B01D 39/083 428/175 |
| 6,423,123 B1 | 7/2002 | Rosenberg |
| 2005/0169820 A1 | 8/2005 | Tatarchuk |

OTHER PUBLICATIONS

International Search Report and Written Opinion for corresponding PCT Application PCT/US2013/030890 dated Jan. 16, 2014.

* cited by examiner

METHODS FOR PREPARING HIGHLY POROUS MICROFIBROUS MEDIA WITH FUNCTIONAL PARTICLES IMMOBILIZED INSIDE

CROSS-REFERENCE TO RELATED APPLICATIONS

This application is a 371 application of International Application No. PCT/US2013/030890, filed Mar. 13, 2013, which claims benefit of U.S. Provisional Application Nos. 61/669,911, filed Jul. 10, 2012 and 61/669,914, filed Jul. 10, 2012.

STATEMENT REGARDING FEDERALLY SPONSORED RESEARCH OR DEVELOPMENT

This invention was made with government support under Grant No. ARMY-W56HZV-05-C0686 awarded by the U.S. Army. The government has certain rights in the invention.

FIELD OF THE INVENTION

This invention is generally in the field of heterogeneous catalysis, particularly structural catalysts.

BACKGROUND OF THE INVENTION

Microfibrous entrapped catalysts (MFECs) or microfibrous entrapped sorbents (MFESs) are known in the art and have been used for various applications. Several steps are required for preparing MFECs and MFESs including fiber mixing, conventional wetlay paper making, media sintering, and catalyst formation as described in U.S. Pat. Nos. 5,080,963, 5,096,663, 5,102,745, 5,304,330, 6,231,792 and U.S. Patent Application Publication No. 2011/0135543.

In the mixing step, the catalyst/sorbent support particles are mixed with micron-sized fibers of metal, polymer, glass, etc. in the presence of water or other liquids as needed. In order to achieve good mixing, the fibers are typically short; having lengths on the order of 2-3 mm. Viscosity modifiers can be added to improve mixing. In order to enhance the strength of the to-be-formed media, binders such as cellulose fibers are typically used. The mixture is then formed as green media on the screen of a sheet former that removes the liquid solution from the solids which typically include fibers, cellulose, and particles. The green media is then compressed to remove water and ensure the particles are well entrapped. Due to the presence of water and other contaminants in the water, some catalysts or catalysts supports are deactivated or poisoned.

After the green media is dried, it is ready to be sintered. In the sintering step, the micron-sized fibers are sintered together forming fiber-fiber junctions. The media form a sintered network locking entrapped particles inside. If the media is made of metal or glass fibers, the green media will be sintered at a high temperature. Hydrogen at a low dew point is typically used to ensure sufficient sintering. In this case, the cellulose fibers are converted to carbon fibers. If carbon fibers are not desired, a pre-oxidation step is typically needed. If the media is made of polymer fibers, it is typically sintered at 100-150° C. For this case a low-dew-point hydrogen atmosphere is not required, and cellulose fibers will remain inside the sintered media.

If pre-oxidation is required, the current practice is to expose the green media in an oxidative environment (typically oxygen lean air containing 5-10% $O_2$ diluted by $N_2$ or steam or other inert gas or combinations) at a temperature of 400-550° C. for 30-60 minutes. In the pre-oxidation step, the cellulose fibers are removed and fragile media is left behind. The media then goes through the sintering step and forms the sintered media.

Both the sintering step and pre-oxidation step require high temperatures and highly reductive or oxidative environments, respectively, particularly the sintering step. Most catalysts or catalyst supports are deactivated due to the loss of surface area and pore volume during sintering and/or pre-oxidation. Moreover, decomposition of cellulose fibers in the pre-oxidation step will generate hydrocarbon intermediates, which may poison catalysts.

In the catalyst formation step, catalyst precursors are loaded on the catalyst supported particles and are converted into active catalysts, typically with thermal treatments. This step varies greatly depending on the catalyst formulation. Corrosive gases such as NOx, HCl, and SOx are commonly present during catalyst formation, and these gases may damage the sintered media. Another major challenge associated with this step is that the detailed catalyst formation conditions must be known; however, this information is typically proprietary and not generally available to the public.

The prior art approaches require catalyst or catalyst support particles to be mixed with fibers in the fiber mixing step. After wetlay paper making, force is applied to compress the media and generate a dense media for particle immobilization. The dense media are then treated as described above. After the sintering step, if catalyst supports are used, they will be loaded with catalyst precursors followed by catalyst formation. During MFEC and MFES preparation, the catalysts or catalyst supports can be easily contaminated or deactivated, especially during fiber mixing in aqueous solutions and high temperature sintering, and the metal fiber structure may also contaminated by gases (e.g. NOx, SOx) generated during catalyst formation step. Moreover, the catalyst formation step requires the disclosure of catalyst formulation and preparation conditions, which are typically proprietary information and protected as trade secrets by most catalyst developers. These limitations significantly hinder the advancement of MFEC and MFES technology.

As discussed above, the process previously developed for MFEC preparation faces numerous technical difficulties. There exists a need to develop improved processes for the preparation of MFECs and MFESs.

Therefore, it is an object of the invention to provide improved processes for the preparation of MFECs and MFESs, particularly processes that overcome the limitations described above.

SUMMARY OF THE INVENTION

Improved methods for preparing highly porous mesh media are described herein. The highly porous media can be used as supports for catalyst materials for a variety of applications. Pre-manufactured catalyst can be loaded into the sintered open media. Thus, the contamination issues associated with wetlay paper making and pre-oxidation, the deactivation issues associated with the sintering and pre-oxidation steps, and/or the corrosion issues associated with the catalyst formation step can be avoided. The methods described herein result in the formation of very porous media and sufficiently uniform loading of catalyst into the media.

The proposed approach includes two steps: blank sheet formation preparation and particle loading, as shown in FIG. 1B. The functional particles are physically loaded into the pre-formed and sintered media in a dry process instead of loading during the sheet formation step as described in the prior art, which is one of the major differences between method described herein and the art as shown in FIG. 1. This allows one to load any commercial or pre-manufactured catalyst/sorbents into microfibrous media without needing to know their formulations and preparation details.

Compared with the sheet prepared using prior art approach, the sheets formed by the process described herein contain no catalyst, sorbent, or support particles and have high void fraction and large openings, which are necessary for follow-on particle loading. In order to maintain these characteristics, any compression during the sheet formation step is avoided. In contrast, compression is required in the prior art approaches in order to immobilize the particles. These differences make new method and devices necessary for such sheet preparation.

BRIEF DESCRIPTIONS OF THE DRAWINGS

DETAILED DESCRIPTION OF THE INVENTION

I. Definitions

Figure 1A:
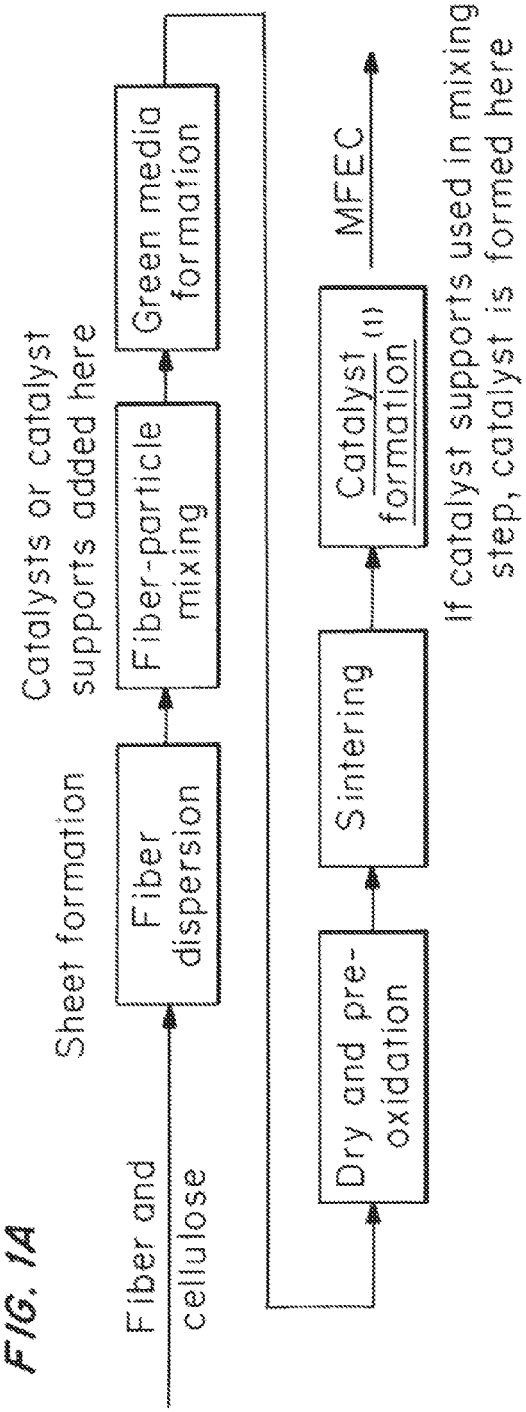
FIG. 1 is the processes schematics of (A) Prior art approach and (B) the method described herein.
Figure 1B:
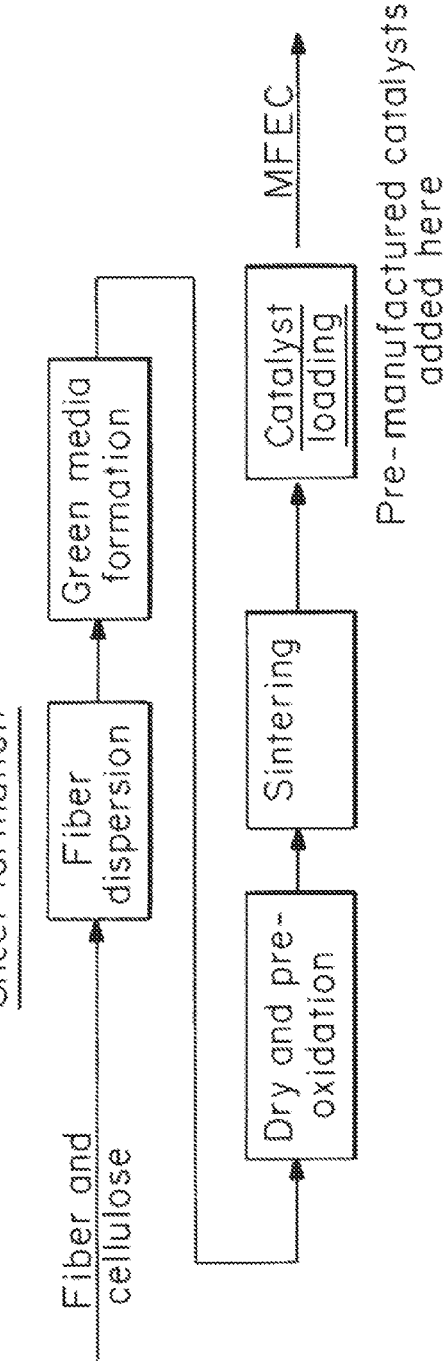

"Structure-forming agent", as used herein, refers to fibrous materials such as cellulose and polymer fibers (especially those long soft fibers with branches) that can entangle other fibers to form a 3-dimensional mesh structures during wetlay sheet formation step. They should also be easily removed from the mesh structure.

"Viscosity modifier", as used herein, refers to a chemical or chemicals that can significantly increase the viscosity of the liquid suspension even at low concentrations.

"Foaming agent", as used herein, refers to surfactants that can generate foams or bubbles in the liquid suspension.

II. Methods for Preparing Highly Porous Mesh Media

Improved methods for preparing highly porous mesh media are described herein. The highly porous media can be used as supports for catalyst materials for a variety of applications. Pre-manufactured catalyst can be loaded into the sintered open media. Thus, the contamination issues associated with wetlay paper making and pre-oxidation, the deactivation issues associated with the sintering and pre-oxidation steps, and/or the corrosion issues associated with the catalyst formation step can be avoided. The methods described herein result in the formation of very porous media and sufficiently uniform loading of catalyst into the media.

The methods include the following steps:
(1) Fiber mixing step
(2) Porous sheet formation step
(3) Sintering step with an optional Pre-oxidation step A. Fiber Mixing Step The first step involves preparing an aqueous dispersion of fibers which will form the mesh. This can be done by dispersing the fibers in water or an aqueous solvent. The solvent can contain or more additives, such as structure forming materials and/or viscosity modifying agents and/or foaming agents. In some embodiments, the solvent contains structure forming materials, such as cellulose or other long soft fibers like cellulose, such as other polysaccharides, fine polymer fibers, foams, other polymeric materials, or combinations thereof.

The fibers can be prepared from a variety of materials including metals, polymers, glass, ceramics, glass, and combinations thereof. The fibers can have any effective diameters, although the diameter is typically less than 1000 microns. In some embodiments, the diameter is from 0.5-200 μm, preferably 4-100 μm. The length of the fibers is typically from about 0.1 to 10 mm, preferably 1 to 10 mm, preferably 3 to 8 mm, preferably 4 to 8 mm, most preferably 5 to 6 mm. In some embodiments, the length of the fibers is about 1 mm. The fibers can be a mixture of fibers having different diameters, lengths, and/or composition. The concentration of the fibers in the suspension is typically less than 10 vol. %, less than 8 vol. %, less than 6 vol. %, less than 4 vol. %, such as 0.5-2 vol. %.

Bent or curved fibers are important for forming porous structures. If the fibers are not pre-bent, the fibers can be bent or kinked during the fiber mixing step. The fibers can be bent or kinked using a variety of techniques known in the art including high speed blades, inclined peddle plates, shear stress of the viscous fluid, jet pumps, and the like. The fibers can be bent or kinked before, during or after dispersing the fibers in a solvent to form the suspension.

B. Porous Sheet Formation

Once the fibers have been mixed, the suspension is treated to form a porous sheet. This can be done by applying the suspension to a sheet forming device, such as a wetlay sheet former, and removing the solvent to form a sheet. In some embodiments, the water is drained slowly, such as at face velocity less than 7 cm/s. At this low velocity, the media will not be compressed by the flowing liquid stream.

Figure 2:
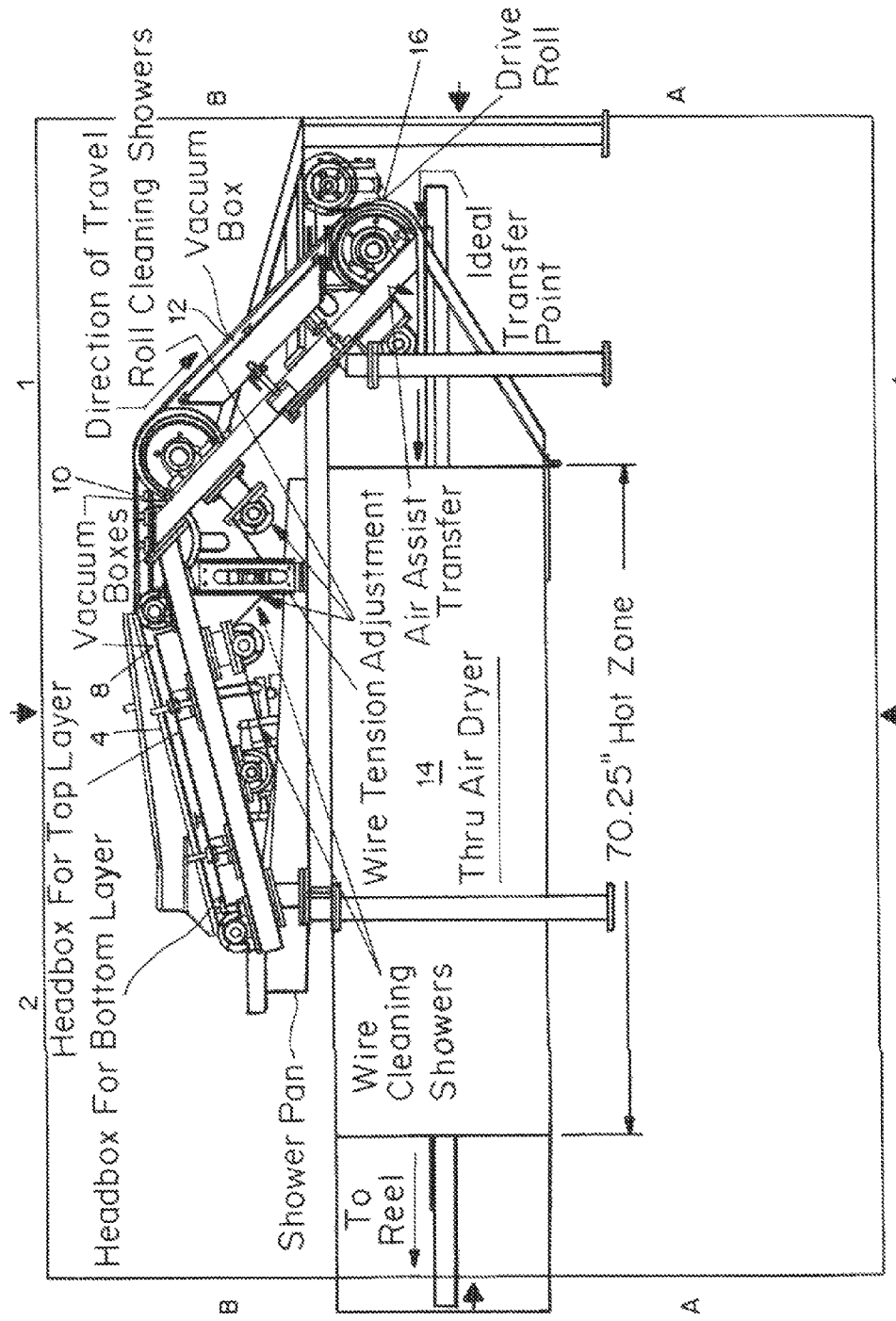
FIG. 2 is a schematic of an inclined sheet former.

Wetlay paper-making techniques can be used to prepare the porous sheets. In the methods described herein, there are no catalyst particles or catalyst support particles inside the green sheet. Moreover, the common practice of compressing the green media is avoided. Specifically, direct media compression and compression due to gravity, vacuum, liquid flow, gas flow, etc. are avoided. In particular embodiments, an inclined sheet former is used in order to avoid compression. An example of an inclined sheet former (2) is shown in FIG. 2.

The inclined sheet former includes 3 major sections. The first section, the sheet formation section, contains two head boxes for the preparation of a green media with two different layers, the top layer (4) and the bottom layer (6). The second section, the conditioning, includes vacuum boxes (8, 10, and 12) to remove excessive water from the wet media. A low vacuum (e.g., couple of inches of water) is typically applied. The third section, the drying section, dries the wet media, typically in a thru air drier (14). This section also includes a special design to transfer the media onto the belt of the drier by gravity without any compression of the media (16). The vacuum level and the drying capacity of the drier work together to minimize the compression generated by the vacuum in the condition section and by gravity.

The sheet forming section typically contains a metal wire screen to which is applied the fiber suspension. The aqueous solvent is removed to form a porous sheet. The metal wire screen can be blinded with patterns. Once the aqueous solvent is drained, the sheet moves to the condition section, where a vacuum can be applied to remove residual solvent. Once the residual solvent has been removed, the sheet can be transferred from the metal wire screen onto a belt for drying. The sheet is typically dried for a sufficient period of time such that the moisture content is less than 5% by weight of the media.

Prior to sintering, the media can be treated to remove any remaining structure forming materials. For example, the media can be heated to a temperature from about 100° C. to about 550° C., in the presence or absence of an oxidative gaseous stream (e.g., contains oxygen), to remove any remaining structure forming materials. This is referred to as the pre-oxidizing step.

C. Sintering

Once the sheet has been dried, the media is sintered to form fiber-fiber junctions. The sintering temperature is dependent on the fiber composition. In some embodiments, the fibers are sintered at a temperature 30-95% of the melting point of the material or materials used to form the fibers. Soldering chemicals can also be used to facilitate sintering. The solder chemicals can significantly reduce the sintering temperature and increase the number fiber-fiber sintered junctions that are formed. In some embodiments, the solder chemical contain oxides of at least one metal element in the metal fibers. In some embodiments, the foaming agent(s), and/or viscosity modifiers, and/or foaming agent(s) are removed prior to sintering.

After sintering, a porous media (sheet) is formed. It contains 0.5-15 vol. % of fibers, typically 0.5-10 vol. % and preferred 0.5-5 vol. %, depending on the fibers material, fiber size, preparation conditions. The opening pore sizes of the media are in the range of 10-120 mesh, typically 50-100 mesh, and preferred 60-90 mesh, depending on the fiber diameter and fiber length and preparation conditions. The void space is at least about 60%, preferably from about 85 to about 99.5%. Fiber length can vary but is typically about 0.1 to about 10 mm. Neither catalyst nor catalyst support particles are immobilized inside this media.

The media can contain multiple layers containing fibers of different diameters and/or different materials. The layer for particle entrapment (entrapment layer) will be made of fiber with large diameters (typically 12-50 micron). It will have large opening sizes and large void volume, which is ideal for particle entrapment. There is another layer of media that is made of fibers of much smaller diameters (typically 1-12 micron and preferably 4-9 micron) and the actual diameter depends on the size of the particles to be entrapped. This layer of media has much smaller opening and will not allow the particles pass through. This layer of media is also called barrier layer. The barrier layer can keep the particles from escaping from the porous media. These multiple layers are made of the same materials but different fiber sizes. The fibers in these two layers can be fused together during the sintering step.

III. Methods for Incorporating Functional Particles into Porous Mesh Media

Functional particles, such as catalyst particles, sorbent particles, reactive particles, catalyst support particles, and combinations thereof can be loaded into the porous mesh media using a variety of techniques known in the art, including vibration and/or fluid flow. The functional particles typically have an average particle size in the range of about 5 to about 30 times the fiber diameter, preferably about 10 to about 20 times the fiber diameter.

Functional particles can be loaded into the media by vibration. The particles are sprinkled on the top of the media. The particles migrate into the media using vibration. Alternatively, the media can be immersed inside the catalyst particles in a container. The container is then vibrated. With vibration, particles migrate into the media from both sides of the media.

Functional particles can be loaded into the media by a flowing stream. Just like the vibration approach, particles are spread on the top of media. A vacuum is applied at the other side of the media and the air stream generated by the vacuum carries the particles into the media. Similarly, the particles can be pre-mixed with a fluid (air or other gaseous or liquid streams). The fluid carries the particles into the media similar to filtration processes.

In some embodiments, the mesh media contains multiple layers with at least one side of the mesh structure made of a layer that the functional particles cannot pass through.

In order to carry particles into the media, the catalyst particles must have the appropriate size range. For example, for a media made of 12 μm copper fibers, a suitable particle size is 70-90 mesh. More examples can be found in Table 1.

TABLE 1

Particles loaded in mesh structure made of different fibers

| Media | Particle Size | Particles (vol. %) |
| --- | --- | --- |
| 9 μm and 6 μm Cu fiber | 70 × 80 mesh | 9.5% |
| 9 μm Cu fiber | 60 × 70 mesh | 23.5% |
| 9 μm Cu fiber + 25 μm Cu wool | 60 × 70 mesh | 20.9% |
| 9 μm Cu fiber + 50 μm Cu wool | 60 × 80 mesh | 17.2% |
| 33 μm Ni fiber | 50 × 80 mesh | 33.2% |

After the catalyst particles are inside the media, the media is compressed to immobilize the particles inside the media. If needed, a barrier layer with much smaller opening sizes (i.e. a compressed media made of much finer fibers) can be sintered together with the highly porous media to keep the catalyst particles from penetrating through the layer of fine fibers.

After catalyst loading, the porous media can entrap catalyst particles of 6-50 vol. % of the media after the media is compressed. This catalyst particle loading is much larger than the particle loading at 5-15 vol % of mesh media prepared using MFEC preparation methods known in the art. Moreover, any commercial or pre-manufactured catalyst particles can be immobilized inside this mesh media as long as they are of the right particle sizes. Therefore, the technical barriers such as catalyst contaminations and deactivations and intellectual property barrier for microfibrous entrapment are removed by the proposed approach.

EXAMPLES

Example 1: Highly Porous Media Containing Copper Fibers

A highly porous media was made of 12 μm copper fibers at a base weight of 60 g/ft$^2$. The green media was made on a 8" handsheet former and was sintered at 800° C. for 30 minutes. The sintered media contains 1.5 vol % of copper fibers. The pore size estimated is in the range of 70-90 mesh.

Another highly porous media was made of 50 micron copper fiber and 9 μm copper fibers at weight ratio of 9:1 at a base weight of 60 g/ft$^2$. Its green media was made on a 8" handsheet former and was sintered at 800° C. for 30 minutes. The sintered media contains 3.1 vol % of copper. The pore size estimated is in the range of 50-90 mesh.

Example 2: Loading Functional Particles into Microfibrous Media by Vibration A method has been established to load catalyst or sorbent particles by vibration. A vibrator which can generate a vibration frequency as high as 120 Hz can be used. It can load particle into a media as large as 1'×1'. The particles have been tested on the vibrator. The test results are shown above in Table 1.

Figure 3:
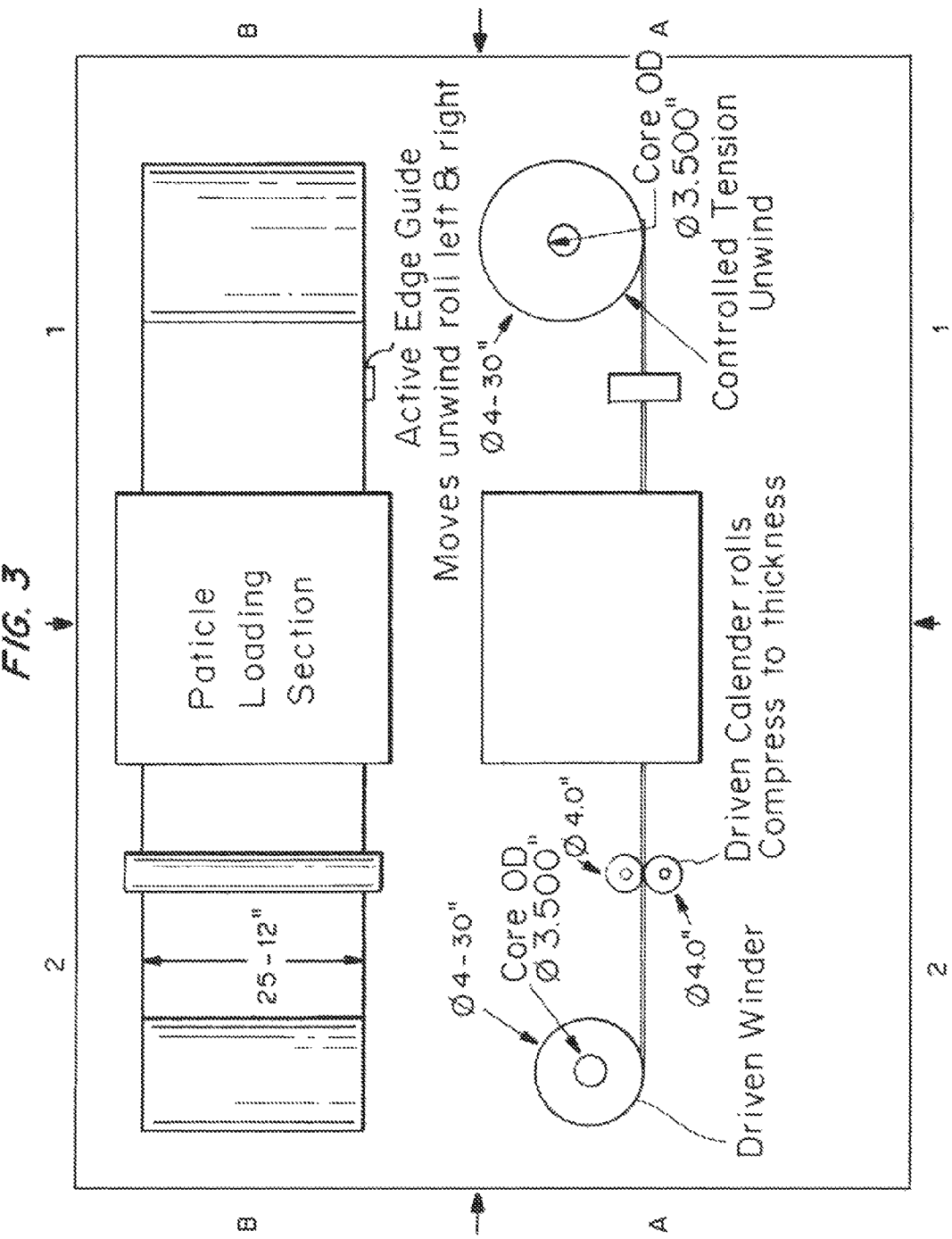
FIG. 3 is a schematic of a device for loading particles into finished porous mesh media using vibration or fluid flow.

A particle loading machine was designed as shown in FIG. 3. The porous media laid on the belt moves from right to left. When the media comes into the particle loading section, the particles are sprayed on the top of the media. If high particle loading is desired, then the entire setup is under vibration so that particles can be loaded into the porous media. If air flow is preferred, an air stream carries fine catalyst particles into the porous media in the particle loading section. In both cases, the media is fed from the roll on the right. After leaving the particle loading section, the media is compressed by a pair of 4" rollers to desired thickness and to immobilize the catalyst particles inside the media.

We claim:

1. A method for preparing porous mesh media comprising fibers and functional particles, the method comprising:
   (a) dispersing the fibers in a liquid suspension, wherein the fibers are kinked, bent, or curved prior, during, or after dispersing the fibers in the suspension;
   (b) applying the dispersion in step (a) on a sheet former to minimize the compression of the media;
   (c) removing the solvent in step (b) to form green media without compressing the green media;
   (d) drying and pre-oxidizing the green media in step (c);
   (e) sintering the dried media in step (d) in a reducing environment to form fiber-fiber junctions, wherein the void space is from about 85 to about 99.5% in the porous mesh media; and
   (f) loading the functional particles into the porous mesh media.

2. The method of claim 1, wherein after step (e) the fibers are present in an amount of 0.5-15 vol. %.

3. The method of claim 1, wherein the fibers have a diameter of 0.5-200 μm.

4. The method of claim 1, wherein the resulting pore sizes of the porous mesh media are from about 40 to about 100 mesh.

5. The method of claim 1, wherein the length of the fibers is about 0.1-10 mm.

6. The method of claim 1, wherein the fibers are formed from a material selected from the group consisting of metals, polymers, glasses and ceramics, and combinations thereof.

7. The method of claim 1, wherein step (a) further comprises bending the fibers using high speed blades, inclined peddle plates, shear stress of the suspension, or jet pumps.

8. The method of claim 1, wherein the functional particles are selected from the group consisting of catalyst particles, sorbent/adsorbent particles, reactive particles, catalyst support materials, and combinations thereof.

9. The method of claim 8, wherein the functional particles have a particle size in the range of 5-30 times the fiber diameter.

10. The method of claim 1, wherein in step (f) the functional particles are loaded into the porous mesh media by migrating through fluid flow generated by positive or negative pressures on one side of the sintered media.

11. The method of claim 10, wherein the fluid is air or other gas or gas mixtures, liquid or liquid mixtures.

12. The method of claim 10, wherein the functional particles are loaded into the porous mesh media by migrating into the mesh structure from one side or multiple sides of the mesh structure.

13. The method of claim 1, wherein the porous mesh media comprises multiple layers with at least one side of the mesh structure made of a layer that the functional particles cannot pass through.

14. The method of claim 1, further comprising after step (f):
   (g) compressing the porous mesh media.

15. The method of claim 2, wherein the fibers are present in an amount of 0.5-10 vol. %.

16. The method of claim 2, wherein the fibers are present in an amount of 0.5-5 vol. %.

17. The method of claim 3, wherein the fibers have a diameter of 4-100 μm.

18. The method of claim 9, wherein the functional particles have a particle size in the range of 10-20 times the fiber diameter.

19. The method of claim 13, wherein at least two layers have different porosities.

20. The method of claim 13, wherein at least one layer comprises fibers with diameters that are different from the diameters of the fibers in another layer.

* * * * *